(12) United States Patent
Vaysman et al.

(10) Patent No.: US 11,334,251 B2
(45) Date of Patent: May 17, 2022

(54) SSD OPERATION IN A NONOPTIMAL MEMORY ENVIRONMENT

(71) Applicant: Western Digital Technologies, Inc., San Jose, CA (US)

(72) Inventors: Dmitry Vaysman, San Jose, CA (US); Eran Erez, Bothell, WA (US); Daniel Edward Tuers, Kapaa, HI (US); Grishma Shah, Milpitas, CA (US); Eakta Anchila, San Jose, CA (US); Man Lung Mui, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 24 days.

(21) Appl. No.: 16/915,709

(22) Filed: Jun. 29, 2020

(65) Prior Publication Data
US 2021/0141539 A1    May 13, 2021

Related U.S. Application Data

(60) Provisional application No. 62/933,619, filed on Nov. 11, 2019.

(51) Int. Cl.
*G06F 3/06* (2006.01)
*G06F 1/20* (2006.01)

(52) U.S. Cl.
CPC .......... *G06F 3/0616* (2013.01); *G06F 1/206* (2013.01); *G06F 3/0634* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,667,997 B2 | 2/2010 | Rodriguez | |
| 8,694,719 B2 | 4/2014 | Lassa et al. | |
| 9,760,311 B1 | 9/2017 | Amir et al. | |
| 10,007,311 B2 | 6/2018 | Raghu et al. | |
| 10,481,014 B2 | 11/2019 | Bahirat et al. | |
| 10,528,097 B2 * | 1/2020 | Cher | G01K 7/42 |
| 10,845,854 B1 * | 11/2020 | Winter | G06F 1/3287 |
| 11,133,075 B2 * | 9/2021 | Blodgett | G06F 12/1458 |
| 2003/0097603 A1 * | 5/2003 | Athas | G06F 1/3203 713/500 |
| 2014/0236380 A1 * | 8/2014 | Alton | G06F 1/203 700/299 |
| 2017/0090784 A1 * | 3/2017 | Reusswig | G06F 3/0634 |
| 2017/0090822 A1 * | 3/2017 | Yadav | G06F 3/0653 |
| 2017/0091015 A1 * | 3/2017 | Yadav | G06F 11/0793 |
| 2017/0351279 A1 * | 12/2017 | Ishii | G06F 13/1694 |
| 2018/0284857 A1 | 10/2018 | Yang et al. | |
| 2019/0171263 A1 * | 6/2019 | Winkel | G06F 1/206 |

* cited by examiner

*Primary Examiner* — Kevin Verbrugge
(74) *Attorney, Agent, or Firm* — Patterson & Sheridan, LLP; Steven H. Versteeg

(57) ABSTRACT

The present disclosure generally relates to thermal throttling a nonvolatile memory device in a data storage device. Nonvolatile memory devices can sustain higher temperatures for a limited duration of time as part of the lifecycle/operation of the device. By allowing for a small margin of time at a higher temperature of operation, the maximum capability of the data storage device is increased. In so doing, the data storage device reliability can be maintained while increasing the device performance.

19 Claims, 8 Drawing Sheets

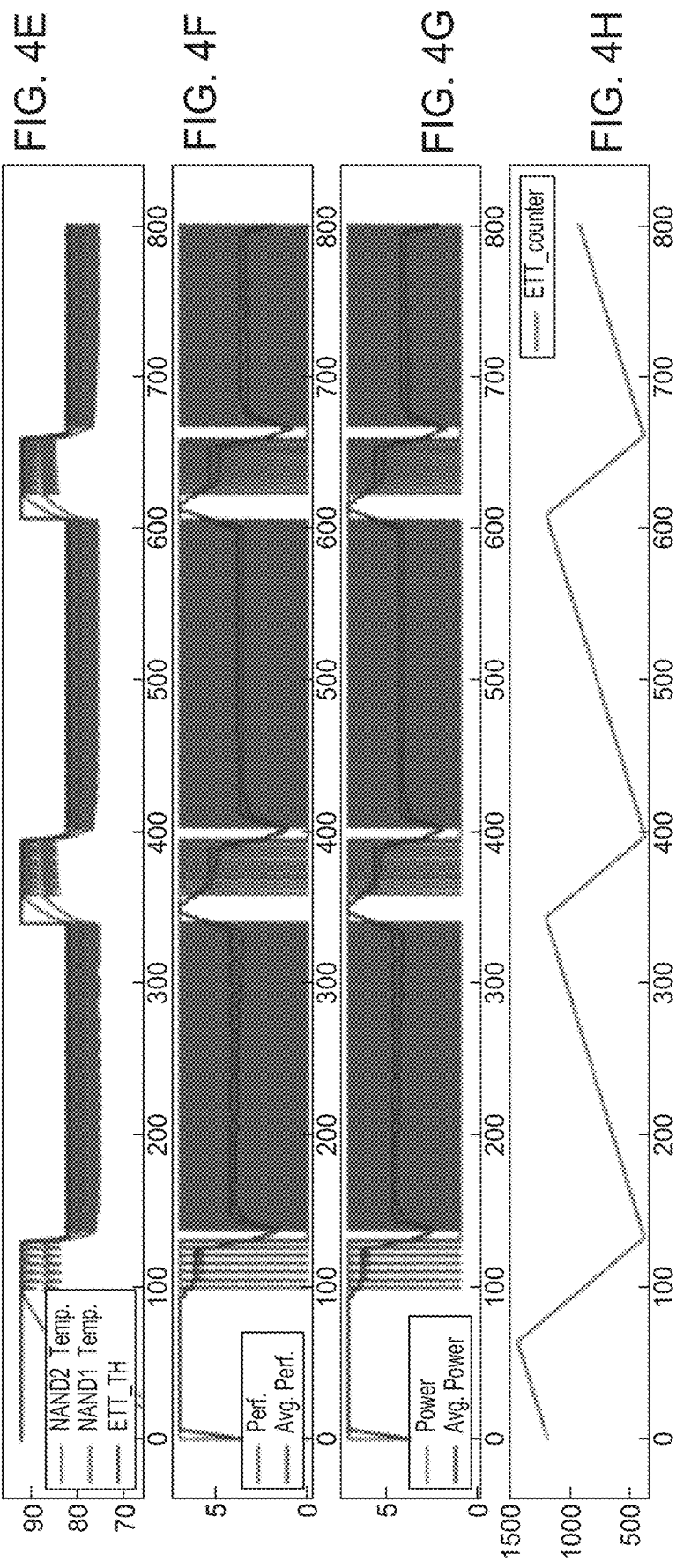

SSD OPERATION IN A NONOPTIMAL MEMORY ENVIRONMENT

CROSS-REFERENCE TO RELATED APPLICATIONS

This application claims benefit of U.S. Provisional Patent Application Ser. No. 62/933,619, filed Nov. 11, 2019, which is herein incorporated by reference.

BACKGROUND OF THE DISCLOSURE

Field of the Disclosure

Embodiments of the present disclosure generally relate to thermal throttling a nonvolatile memory device.

Description of the Related Art

Thermal throttling impedes device performance. With faster interfaces (e.g., PCIe fourth generation) and smaller form factors, power dissipation becomes a greater challenge, and devices are more prone to reaching throttling temperature. Solid state device (SSD) user workload is often has bursts of higher performance interleaved with lower performance periods.

NAND operational temperature is limited in order guarantee retention. With the introduction of PCIe Gen4×4, the data storage device will operate at about 7 GB/s. The power consumption and thermals when operating at 7 GB/s set a limit for the duration of the high performance workloads. Without any architectural change or increases NAND temperature tolerance, the device will need to throttle in a short period of time. The throttling event limits the maximum capability of the data storage device.

While a fixed limit of the NAND operational temperature may seem like a reasonable solution, such a conservative approach limits the device performance as the thermal limit is typically set to 90 degrees Celsius.

Therefore, there is a need in the art for a manner to appropriately throttle the data storage device temperature while still being able to accommodate the bursts of high performance common in such devices.

SUMMARY OF THE DISCLOSURE

The present disclosure generally relates to thermal throttling a nonvolatile memory device in a data storage device. Nonvolatile memory devices can sustain higher temperatures for a limited duration of time as part of the lifecycle/operation of the device. By allowing for a small margin of time at a higher temperature of operation, the maximum capability of the data storage device is increased. In so doing, the data storage device reliability can be maintained while increasing the device performance.

In one embodiment, a data storage device comprises: a nonvolatile memory device; and a controller coupled to the nonvolatile memory device, the controller is configured to: receive temperature measurements from one or more temperature locations of the data storage device; calculate a percentage of operational time that the nonvolatile memory device can be exposed to a temperature that is greater than a predetermined temperature threshold; and permit the nonvolatile memory device to operate at a temperature that is greater than the predetermined temperature threshold for the percentage of operational time calculated.

In another embodiment, a data storage device comprises: a nonvolatile memory device; and a controller coupled to the nonvolatile memory device, the controller is configured to: dynamically adjust a period of time that the nonvolatile memory device may exceed a predetermined temperature threshold; and dynamically adjust the temperature threshold from the predetermined temperature threshold.

In another embodiment, a data storage device comprises: a nonvolatile memory device; means to throttle a temperature threshold; and means to track a temperature of the nonvolatile memory device and to track a time of exposure to the temperature of the nonvolatile memory device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4H are graphs illustrating the results of temperature throttling according to one embodiment.

Figure 1:
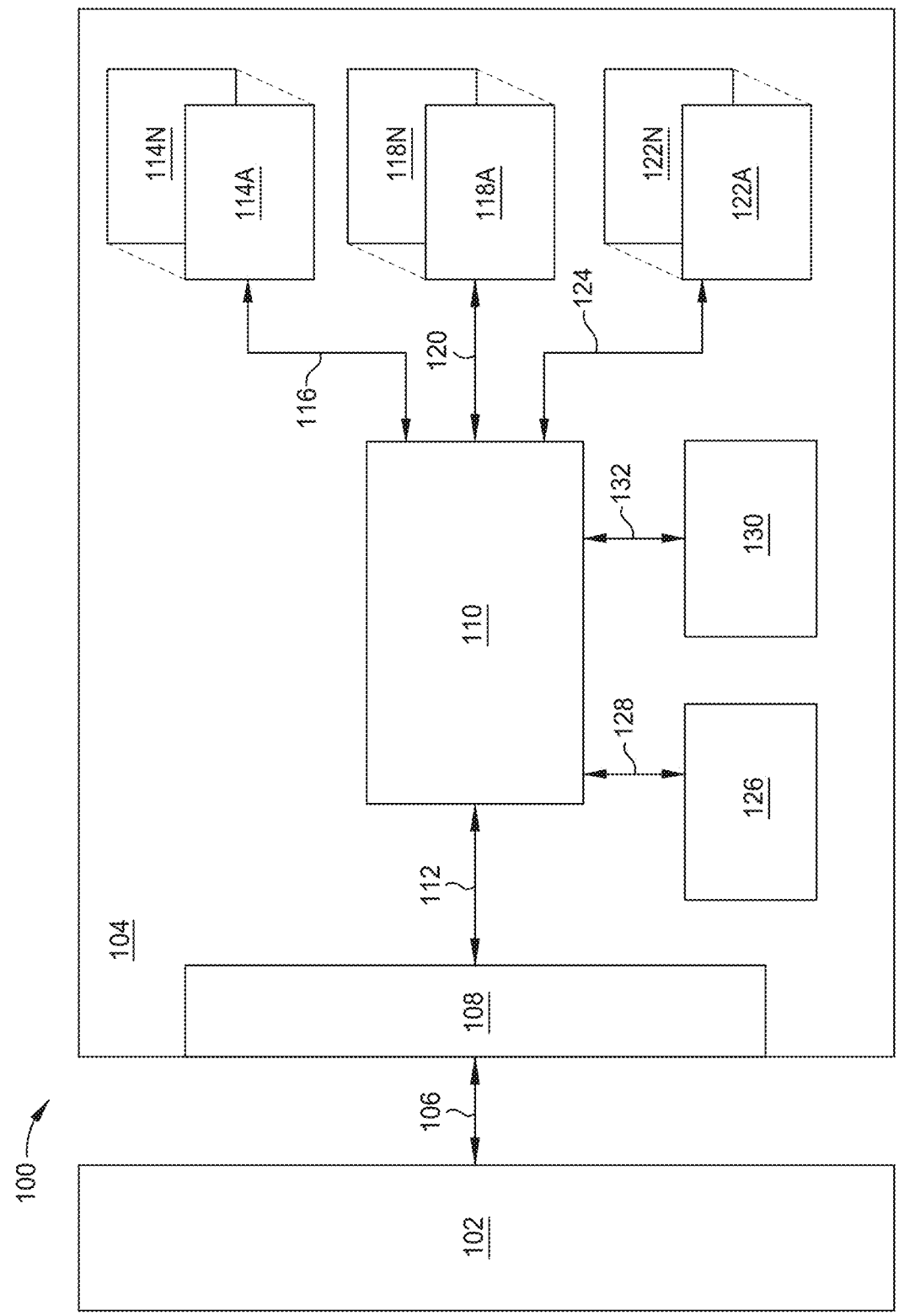
FIG. 1 is a schematic illustration of a system comprising a host device and a data storage device.

The patent or application file contains at least one drawing executed in color. Copies of this patent or patent application publication with color drawing(s) will be provided by the Office upon request and payment of the necessary fee.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to thermal throttling a nonvolatile memory device in a data storage device. Nonvolatile memory devices can sustain higher temperatures for a limited duration of time as part of the lifecycle/operation of the device. By allowing for a small margin of time at a higher temperature of operation, the maximum capability of the data storage device is increased. In so doing, the data storage device reliability can be maintained while increasing the device performance.

FIG. 1 is a schematic illustration of a system 100 comprising a host device 102 and a data storage device 104. The data storage device 103 includes an interface 108 to permit communication with the host device 102 as shown by arrow 106. The data storage device 104 includes a controller 110. The controller 110 is coupled to one or more nonvolatile memory devices 114A-114N and communicates with the one or more nonvolatile memory device 114A-114N as shown by arrow 116. One or more volatile memory devices 118A-118N are also coupled to the controller 110 and communicate with the controller 110 as shown by arrows 120. The controller 110 is also coupled to one or more temperature sensors 122A, 122N and communicate therewith as shown by arrow 124. The controller is also coupled to an ASIC 126 as shown by arrow 128 as well as one or more power connections 130 as shown by arrow 132.

As discussed herein, the throttling temperature threshold can be controlled in order to benefit from short duration high performance as well as to preserve long term nonvolatile memory reliability. In one embodiment, the nonvolatile memory is NAND. The algorithm is based on keeping track of the memory device (e.g. SSD) temperature exposure. In one embodiment, the algorithm uses one or more weighted counters. The counter counts the amount of temperature samples below and above a temperature threshold. When the balance is broken and the duration of the high temperature operation exceeds the preset maximum, the counter will indicate that the temperature threshold needs to be reduced. When the threshold is reduced, the data storage device throttles in lower temperature to allow the nonvolatile memory device to cool down. Cooling down the nonvolatile memory device accumulates the budget to allow high performance operations. The balance is controlled by a parameter discussed below.

In operation, the counter is set with an initial value that allows the starting budget of the higher temperature exposure. X and Y determine the weights for the temperature above or below a predetermined threshold. The counter is incremented by Y when the temperature is below the predetermined temperature threshold, and the counter is decremented by X when the temperature exceeds the predetermined temperature threshold. The percentage of operational time that the nonvolatile memory can be exposed to the higher temperature conditions is represented by the formula $X/(X+Y)$. Incrementing or decrementing is aligned to the temperature sensor readouts. The readout is periodical, which allows for maintaining the ratio of X and Y in terms of time. The algorithm is not sensitive to the sensing period change or a variation during operation.

Figure 2:
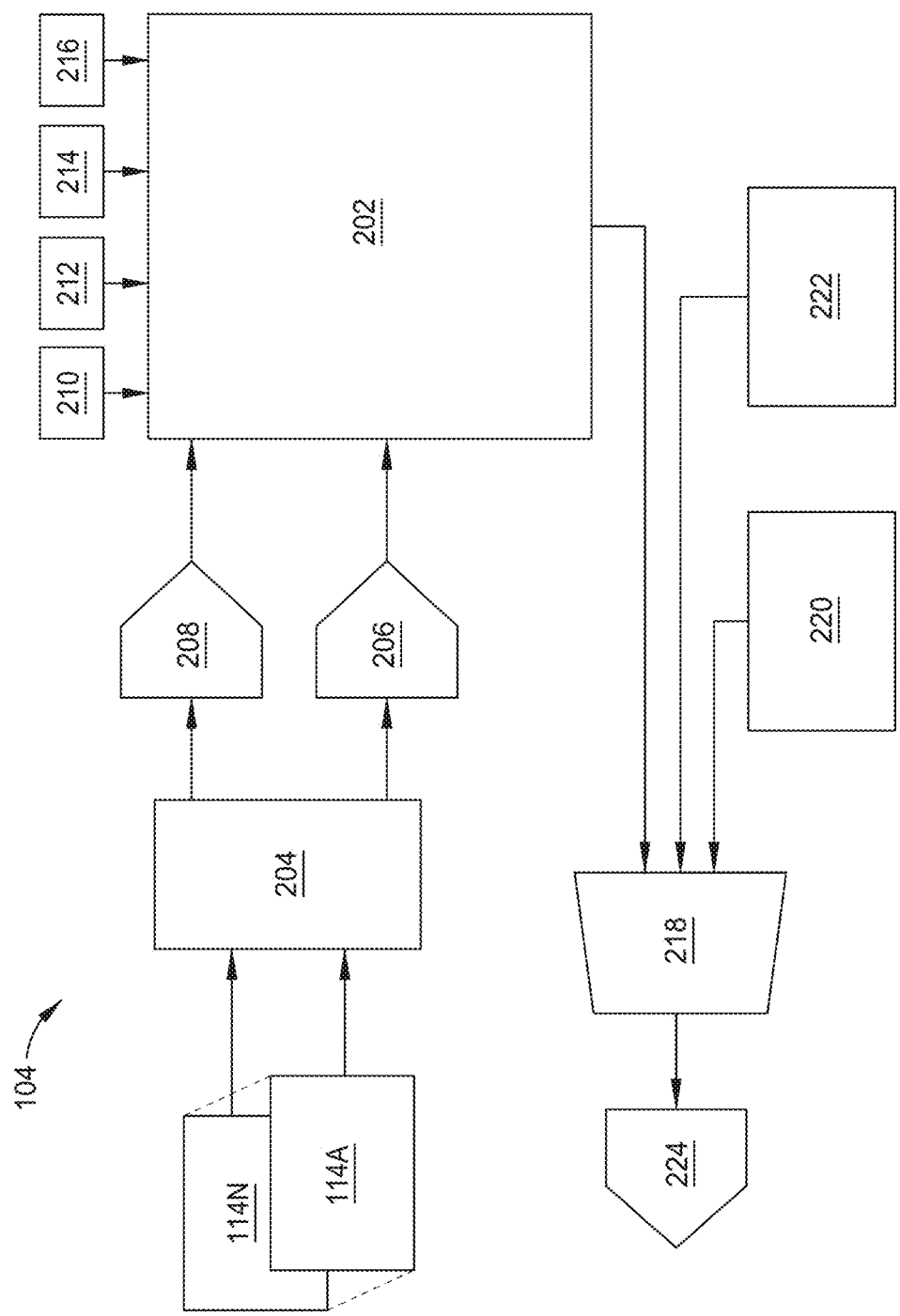
FIG. 2 is a schematic illustration of a data storage device according to one embodiment.

FIG. 2 is a schematic illustration of a data storage device 104 according to one embodiment. The data storage device includes a weighted counter 202. The nonvolatile memory devices 114A, 114N are coupled to the weighted counter 202 through a temperature threshold device 204 that stores the predetermined threshold temperature. The measured temperature of the nonvolatile memory devices 114A, 114N is fed to the temperature threshold device 204 that makes a comparison of the measured temperature relative to the threshold temperature. If the measured temperature is above the threshold temperature, then the temperature threshold device 204 sends a signal to decremental device 206 that informs the weighted counter 202 to decrement X. Conversely, if the measured temperature is below the threshold temperature, the temperature threshold device 204 sends a signal to incremental device 208 to inform the weighted counter 202 to increment Y. The value of X is stored in the X unit 210; the value of Y is stored in the Y unit 212; the initial value is stored in initial unit 214; and the result of the formula is stored in the calculation unit 216. The results of the weighted counter 202 are sent to multiplex unit 218 as are temperature measurements from sensors 220, 222. The resulting output from the multiplexer 218 is the resulting time duration that the nonvolatile memory device 114A, 114N can stay be at the measured temperature above the temperature threshold as well as the calculated new temperature threshold. It is to be understood that the new temperature threshold may be identical to the predetermined temperature threshold. Additionally, the new temperature threshold may be different from the predetermined threshold based upon the calculations performed using the weighted counter.

Figure 3:
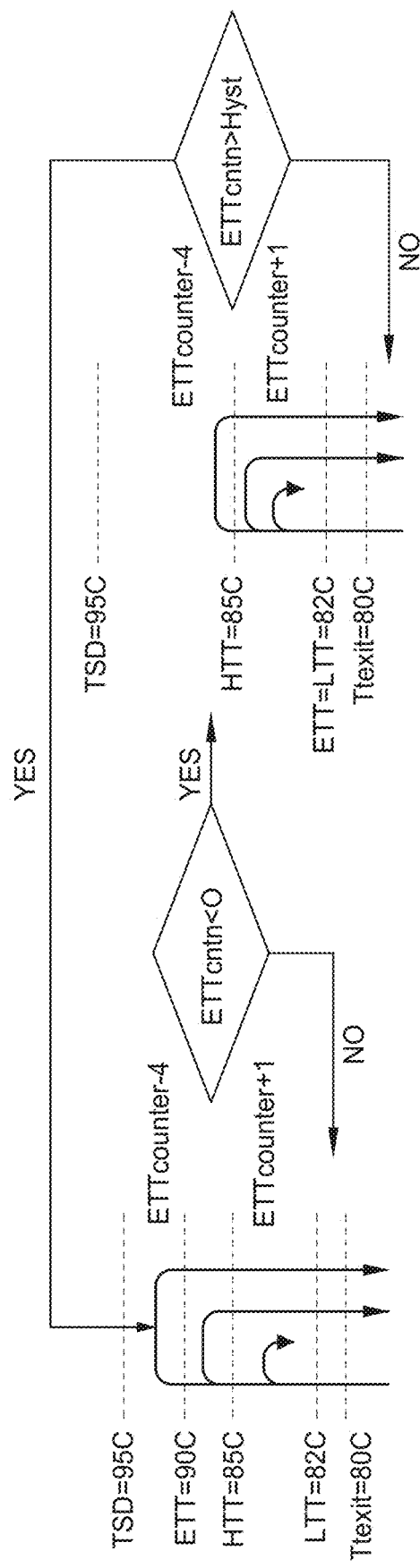
FIG. 3 is a schematic illustration of an example exposure above a temperature above a threshold according to one embodiment.

FIG. 3 is a schematic illustration of an example exposure above a temperature above a threshold according to one embodiment. For the example shown in FIG. 3, the nonvolatile memory device experiences a 20% exposure to a temperature above the threshold temperature. For FIG. 3, the threshold is set 20% higher to 95 degrees Celsius. At 90 degrees Celsius, there is extreme thermal throttling. At 85 degrees Celsius there is high thermal throttling. At 82 degrees there is low thermal throttling. At 80 degrees Celsius, the device exits the throttling. If the measured temperature is greater than the extreme thermal throttling temperature, then the path on the left is utilized. If the measured temperature is less than the extreme thermal throttling temperature, then the path on the right is used.

Figure 4A:
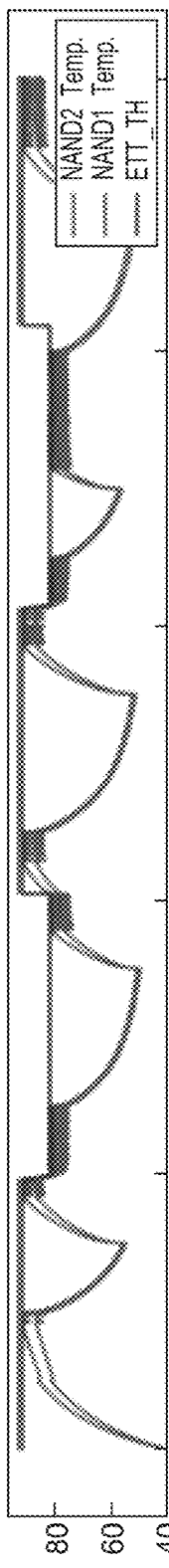
Figure 4B:
Figure 4C:
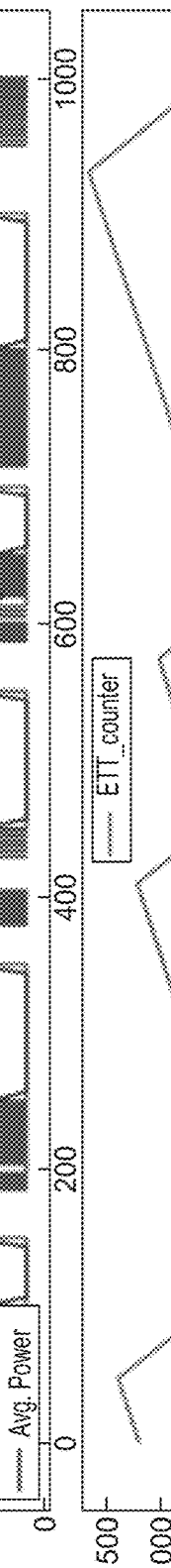
Figure 4D:
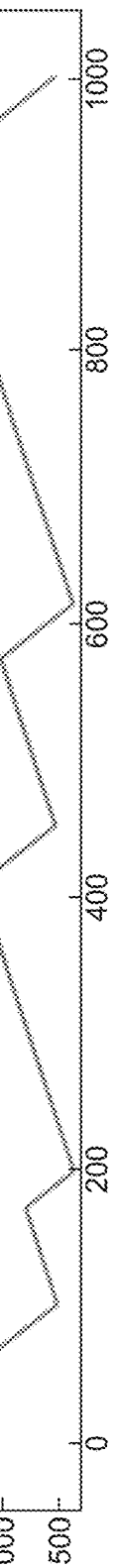

FIGS. 4A-4D are graphs illustrating the results of temperature throttling according to one embodiment. In FIG. 4A, the blue line represents the throttling temperature while the red and green lines represent the temperature of two separate nonvolatile memory devices 114A, 114N. FIG. 4B shows the overall data storage device 104 performance as the temperature of the nonvolatile memory devices 114A, 114N from FIG. 4A change. FIG. 4C shows the overall power consumption and hence throttling as the temperature of the nonvolatile memory devices 114A, 114N from FIG. 4A change. FIG. 4D shows the counter changing as the temperature of the nonvolatile memory devices 114A, 114N from FIG. 4A change. In FIGS. 4A-4D, a mixed workload operation is illustrated.

FIGS. 4E-4H are graphs illustrating the results of temperature throttling according to one embodiment. In FIG. 4E, the blue line represents the throttling temperature while the red and green lines represent the temperature of two separate nonvolatile memory devices 114A, 114N. FIG. 4F shows the overall data storage device 104 performance as the temperature of the nonvolatile memory devices 114A, 114N from FIG. 4E change. FIG. 4G shows the overall power consumption and hence throttling as the temperature of the nonvolatile memory devices 114A, 114N from FIG. 4E change. FIG. 4H shows the counter changing as the temperature of the nonvolatile memory devices 114A, 114N from FIG. 4E change. In FIGS. 4E-4H, a sustained operation is illustrated. FIGS. 4E-4H show the predefined percentage of time of the device operates in high performance while otherwise in low performance.

Figure 5:
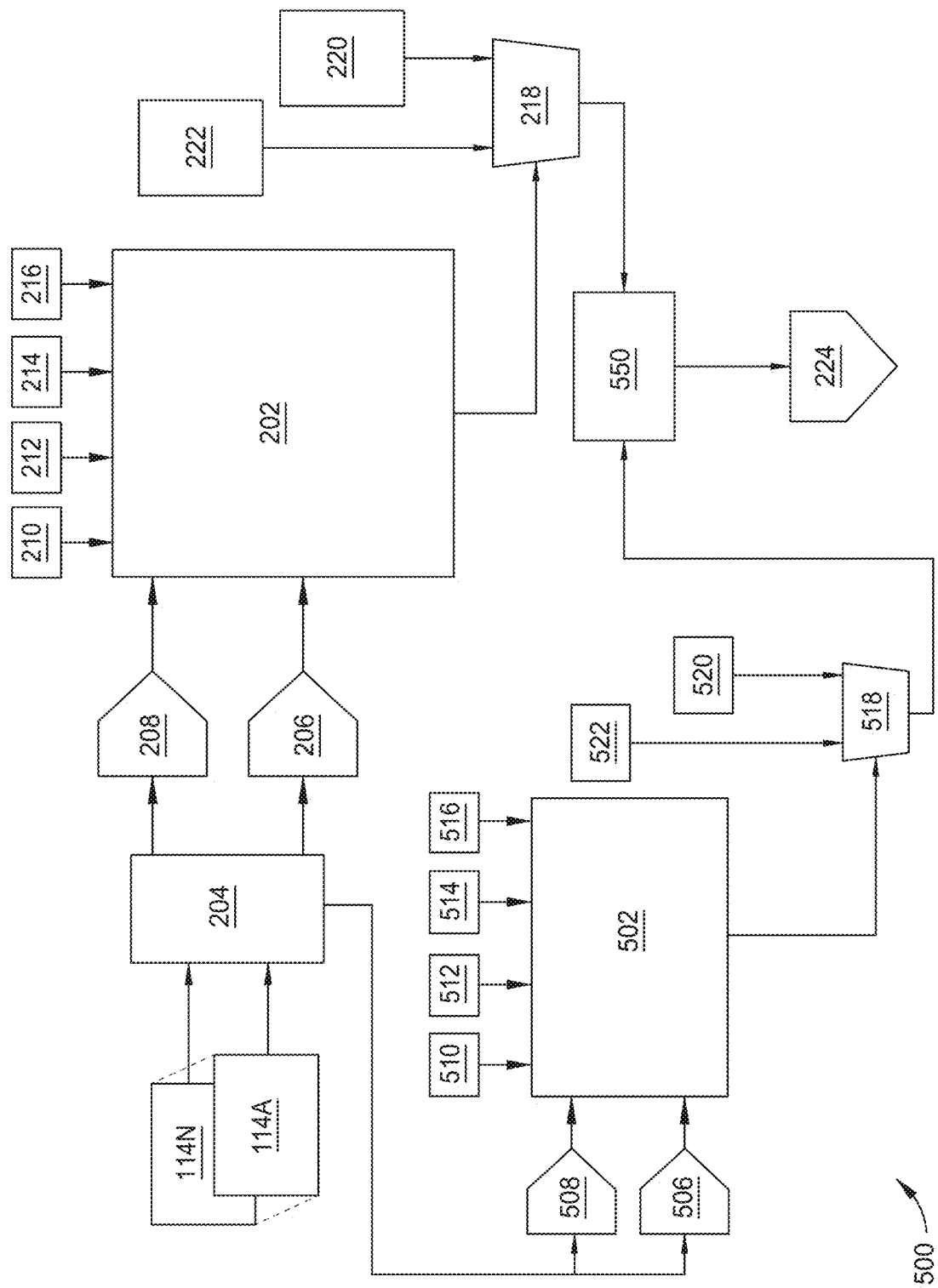
FIG. 5 is a schematic illustration of a data storage device according to another embodiment.

The scheme discussed herein is applicable to multiple thresholds and/or measurement window durations. FIG. 5 is a schematic illustration of a data storage device 500 according to another embodiment that is applicable to multiple thresholds. The data storage device 500 includes a second weighted counter 502. The nonvolatile memory devices 114A, 114N are coupled to the weighted counter 502 through the temperature threshold device 204 that stores the predetermined threshold temperature. The measured temperature of the nonvolatile memory devices 114A, 114N is fed to the temperature threshold device 204 that makes a comparison of the measured temperature relative to the threshold temperature. If the measured temperature is above the threshold temperature, then the temperature threshold device 204 sends a signal to decremental device 506 that informs the weighted counter 502 to decrement X. Conversely, if the measured temperature is below the threshold temperature, the temperature threshold device 204 sends a signal to incremental device 508 to inform the weighted counter 502 to increment Y. The value of X is stored in the X unit 510; the value of Y is stored in the Y unit 512; the initial value is stored in initial unit 514; and the result of the formula is stored in the calculation unit 516. The results of the weighted counter 502 are sent to multiplex unit 518 as are temperature measurements from sensors 520, 522. The resulting output from the multiplexer 518 is the resulting time duration that the nonvolatile memory device 114A, 114N can stay be at the measured temperature above the temperature threshold as well as the calculated new temperature threshold. It is to be understood that the new temperature threshold may be identical to the predetermined temperature threshold. Additionally, the new temperature threshold may be different from the predetermined threshold based upon the calculations performed using the weighted counter. The result of the multiplexers 218, 518 is fed to a combiner device 550 the coordinates the distribution of the results.

The running value of the counter can be preserved during shutdown so that the product lifetime aspects can be tracked. As the nonvolatile memory device ages with time or as a function of process/erase cycles, it is possible that the counter parameters can be changes to adjust the temperature exposure allowance. It is also possible that the temperature exposure indication will trigger mitigation mechanisms, for example an indication of high temperature exposure can increase the nonvolatile memory read-scrub protection mechanism rate. Finally, the entire algorithm can be disabled once the nonvolatile memory device reaches a certain amount of cycling limit beyond which the bit error rate degredation due to the temperature becomes significantly higher. Additionally, the counter can be reset to a high positive value upon detection of events such as secure erase; trimming of all LBAs; logically empty drive, an other event that indicates that obsoletes all the existing data on the drive and hence restarts the data retention cycle; and combinations thereon. In a system with multiple nonvolatile memory components at different thermal locations, it is possible that such control mechanism can be implemented per thermal location in a way that individually controls the temperature exposure per location.

Figure 6:
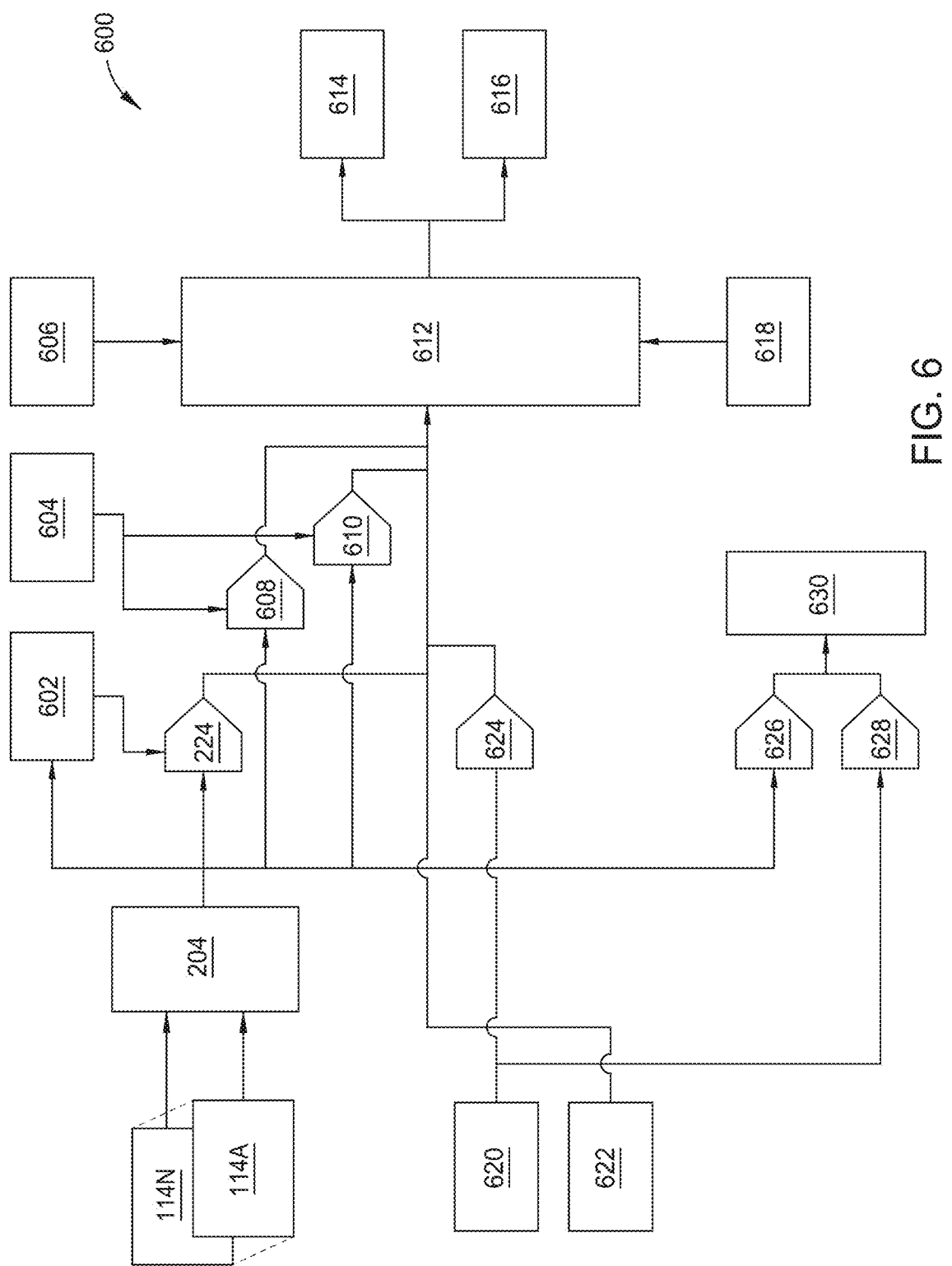
FIG. 6 is a schematic illustration of a thermal server according to one embodiment.

FIG. 6 is a schematic illustration of a thermal server 600 according to one embodiment. The server 600 includes a device 602 for dynamically monitoring how long the nonvolatile memory devices 114A, 114N are exposed to a temperature above the threshold temperature. The device 602 can also change the threshold temperature. A heat control thermal management device 604 is also present as is a power source 606 such as a NVMe power source. Several other devices 608, 610 are also present for providing the new temperature threshold based upon different thermal locations of the nonvolatile memory devices 114A, 114N. The power source 606 and the devices 224, 608, 610 all feed into the driver 612 which implements the temperature throttling by changing the command fetching per the fetching device 616 and the resources in use per the resource device 614. Additional devices 618 may provide additional information to the driver 612. An ASIC device 620 may also be present along with a thermal threshold device 624 that feeds to the driver 612. Additional devices 622 with temperature thresholds can also be present such as a PMICIRQ that feeds information directly to the driver 612. Additional temperature threshold devices 626, 628 are also present to feed information to a TSD driver 630.

Figure 7:
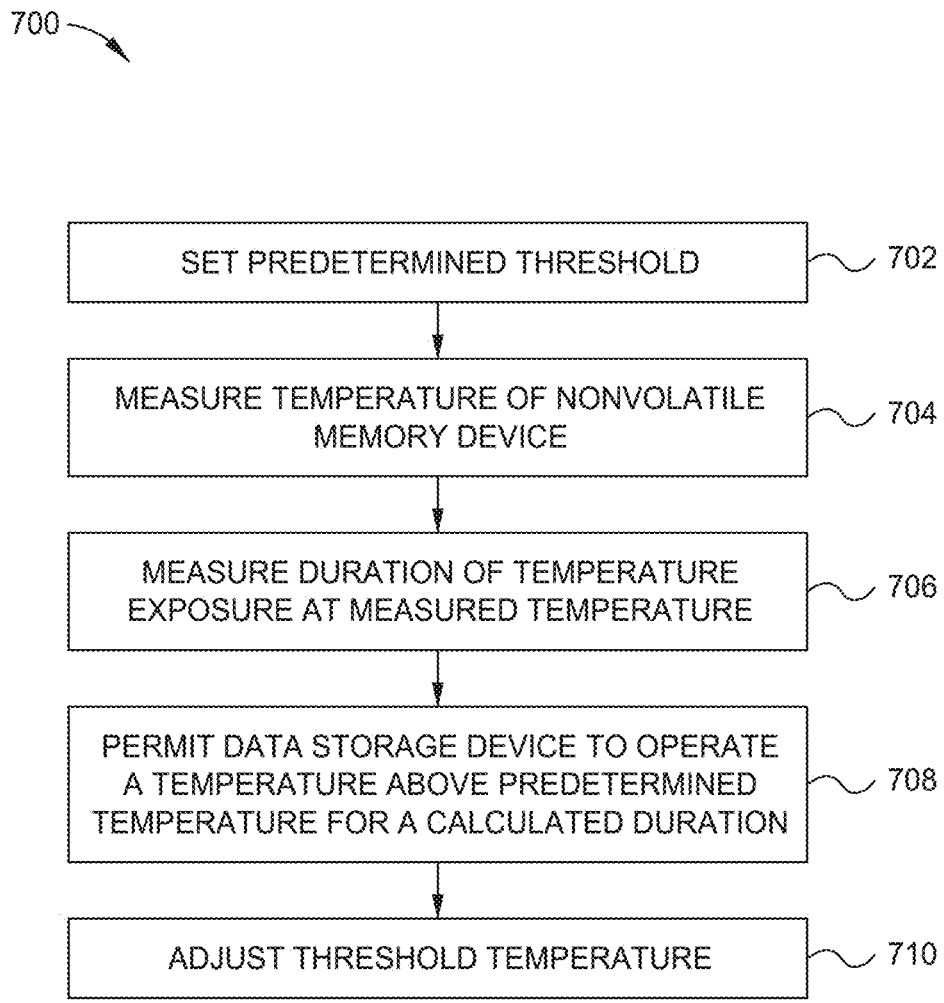
FIG. 7 is a flowchart illustrating a method of dynamically adjusting a temperature threshold.

FIG. 7 is a flowchart 700 illustrating a method of dynamically adjusting a temperature threshold. As step 702, the predetermined threshold is set. At step 704, the temperature of the nonvolatile memory device is measured. As step 706, the duration of the temperature exposure is measured. At step 708, the data storage device is permitted to operate at a temperature above the predetermined temperature for the calculated duration. At step 710, the threshold temperature is changed.

In one embodiment, a data storage device comprises: a nonvolatile memory device; and a controller coupled to the nonvolatile memory device, the controller is configured to: receive temperature measurements from one or more temperature locations of the data storage device; calculate a percentage of operational time that the nonvolatile memory device can be exposed to a temperature that is greater than a predetermined temperature threshold; and permit the nonvolatile memory device to operate at a temperature that is greater than the predetermined temperature threshold for the percentage of operational time calculated. The nonvolatile memory device is a NAND device. The data storage device further comprises at least one temperature sensor coupled to the controller. The controller is configured to change the predetermined temperature threshold. The controller is configured to track multiple temperature thresholds. The controller includes a weighted counter that tracks the temperature and temperature exposure time for the nonvolatile memory device. The weighted counter is configured to count an amount of temperature samples below and above the threshold temperature. The weighted counter is further configured to track a duration of time that the nonvolatile memory device operates at a temperature greater than the threshold temperature. The controller is configured to throttle the data storage device to lower the temperature of the nonvolatile memory device.

In another embodiment, a data storage device comprises: a nonvolatile memory device; and a controller coupled to the nonvolatile memory device, the controller is configured to: dynamically adjust a period of time that the nonvolatile memory device may exceed a predetermined temperature threshold; and dynamically adjust the temperature threshold from the predetermined temperature threshold. The controller is further configured to dynamically adjust the predetermined temperature threshold based upon temperature readings of an ASIC. The controller is further configured to dynamically adjust the predetermined temperature threshold based upon temperature readings of the nonvolatile memory device. The controller is further configured to throttle power to the data storage device. The controller is further configured to throttle command fetching from a host device. The controller is further configured to track cycling of the nonvolatile memory device. The nonvolatile memory device if a first nonvolatile memory device, the data storage device further comprising a second nonvolatile memory device, wherein the first nonvolatile memory device and the second nonvolatile memory device are disposed at different thermal locations. The controller is configured to control temperature exposure for the first nonvolatile memory device independent of the second nonvolatile memory device. The controller is configured to reset a the threshold temperature upon detecting a secure erase event, a trimming of all LBAs, a logically empty drive, or combinations thereof.

In another embodiment, a data storage device comprises: a nonvolatile memory device; means to throttle a temperature threshold; and means to track a temperature of the nonvolatile memory device and to track a time of exposure to the temperature of the nonvolatile memory device. The data storage device further comprises means to adjust the threshold temperature.

By appropriately throttling the data storage device temperature, bursts of high performance can be accomodated.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a nonvolatile memory device; and
a controller coupled to the nonvolatile memory device, wherein the controller includes a weighted counter configured to track a temperature and a temperature exposure time for the nonvolatile memory device, and wherein the controller is configured to:
receive temperature measurements from one or more temperature locations inside the data storage device;
calculate a percentage of operational time that the nonvolatile memory device can be exposed to a temperature that exceeds a predetermined temperature threshold; and
permit the nonvolatile memory device to operate at a temperature that exceeds the predetermined temperature threshold for the percentage of operational time calculated.

2. The data storage device of claim 1, wherein the nonvolatile memory device is a NAND device.

3. The data storage device of claim 1, further comprising at least one temperature sensor coupled to the controller.

4. The data storage device of claim 1, wherein the controller is further configured to change the predetermined temperature threshold.

5. The data storage device of claim 1, wherein the controller is further configured to track multiple temperature thresholds.

6. The data storage device of claim 1, wherein the weighted counter is further configured to count an amount of temperature samples below and above a temperature threshold.

7. The data storage device of claim 6, wherein the weighted counter is further configured to track a duration of time that the nonvolatile memory device operates at a temperature exceeding the temperature threshold.

8. The data storage device of claim 1, wherein the controller is further configured to throttle the data storage device to lower the temperature of the nonvolatile memory device.

9. A data storage device, comprising:
a nonvolatile memory device; and
a controller coupled to the nonvolatile memory device, wherein the controller includes a weighted counter configured to track temperature and temperature exposure time for the nonvolatile memory device, and wherein the controller is configured to:
dynamically adjust a period of time that the nonvolatile memory device may exceed a predetermined temperature threshold; and
dynamically adjust the temperature threshold from the predetermined temperature threshold.

10. The data storage device of claim 9, wherein the controller is further configured to dynamically adjust the predetermined temperature threshold based upon temperature readings of an ASIC.

11. The data storage device of claim 9, wherein the controller is further configured to dynamically adjust the predetermined temperature threshold based upon temperature readings of the nonvolatile memory device.

12. The data storage device of claim 9, wherein the controller is further configured to throttle power to the data storage device.

13. The data storage device of claim 9, wherein the controller is further configured to throttle command fetching from a host device.

14. The data storage device of claim 9, wherein the controller is further configured to track cycling of the nonvolatile memory device.

15. The data storage device of claim 9, wherein the nonvolatile memory device is a first nonvolatile memory device, the data storage device further comprising a second nonvolatile memory device, wherein the first nonvolatile memory device and the second nonvolatile memory device are disposed at different thermal locations.

16. The data storage device of claim 15, wherein the controller is further configured to control temperature exposure for the first nonvolatile memory device independent of the second nonvolatile memory device.

17. The data storage device of claim 9, wherein the controller is further configured to reset the temperature threshold upon detecting a secure erase event, a trimming of all LBAs, a logically empty drive, or combinations thereof.

18. A data storage device, comprising:
a nonvolatile memory device;
means to throttle the data storage device when a temperature threshold is exceeded; and
means to track a temperature of the nonvolatile memory device and to track a time of exposure to the temperature of the nonvolatile memory device.

19. The data storage device of claim 18, further comprising means to adjust the temperature threshold.

* * * * *

UNITED STATES PATENT AND TRADEMARK OFFICE
CERTIFICATE OF CORRECTION

PATENT NO. : 11,334,251 B2
APPLICATION NO. : 16/915709
DATED : May 17, 2022
INVENTOR(S) : Dmitry Vaysman et al.

It is certified that error appears in the above-identified patent and that said Letters Patent is hereby corrected as shown below:

On the Title Page

Item (72) correct the spelling of the Inventor's name from Eakta ANCHILA to Eakta ANCHLIA Signed and Sealed this
Second Day of August, 2022

*Katherine Kelly Vidal*

Katherine Kelly Vidal
*Director of the United States Patent and Trademark Office*